United States Patent [19]

Jacquier

[11] Patent Number: 4,899,436
[45] Date of Patent: Feb. 13, 1990

[54] REMOTELY CONTROLLED DEVICE FOR FITTING AND WITHDRAWING A PLUG FOR CLOSING A STEAM GENERATOR TUBE

[75] Inventor: Paul Jacquier, Tassin la Demi-Lune, France

[73] Assignee: Framatome, Courbevoie, France

[21] Appl. No.: 258,733

[22] Filed: Oct. 17, 1988

[30] Foreign Application Priority Data

Oct. 16, 1987 [FR] France .................... 87 14326

[51] Int. Cl.⁴ .................................... B23P 15/26
[52] U.S. Cl. .................... 29/727; 29/890.031; 29/522.1; 29/723; 29/726
[58] Field of Search .......... 29/157.4, 426.5, 426.6, 29/521, 522.1, 523, 720, 723, 726, 727, 809; 376/206; 414/222, 224, 225; 406/165, 176, 179; 221/1, 210; 165/71; 138/97, 89

[56] References Cited

U.S. PATENT DOCUMENTS

| | | | |
|---|---|---|---|
| 4,366,617 | 1/1983 | Nanstiel et al. | 29/727 O R |
| 4,390,042 | 6/1983 | Kucherer et al. | 29/523 X |
| 4,660,270 | 4/1987 | Rieben et al. | 29/723 X |
| 4,672,791 | 6/1987 | Rieben et al. | 29/723 X |
| 4,679,315 | 7/1987 | Overbay | 29/726 O R |
| 4,679,377 | 7/1987 | Rieben et al. | 29/723 X |
| 4,734,972 | 4/1988 | Hawkins | 165/71 X |
| 4,784,561 | 11/1988 | Cartry et al. | 29/723 X |

FOREIGN PATENT DOCUMENTS

| | | |
|---|---|---|
| 0058850 | 1/1982 | European Pat. Off. . |
| 0131792 | 1/1985 | European Pat. Off. . |
| 0208479 | 1/1987 | European Pat. Off. . |
| 2211721 | 7/1974 | France . |

Primary Examiner—Howard N. Goldberg
Assistant Examiner—Irene Cuda
Attorney, Agent, or Firm—Pollock, Vande Sande & Priddy

[57] ABSTRACT

The device comprises a handling arm (21) arranged inside the water box of the steam generator and permitting the assembly for fitting and withdrawing a plug (22) to be placed in the alignment of the tubes of the steam generator bundle. The device additionally comprises an endless screw (35) for moving the tubes in the axial direction, which is fastened to the handling arm (21), a support (44) fastened to the endless screw (35), movable in the axial direction, a linking member (51) carried by the support (44) for removable fastening to the plug body, and a sliding rod (55) actuated by a jack integral with the support (44). The rod (55) actuated by the jack permits, a thrust to be exerted on the plug held by the connecting member (51), in order to produce its extension and facilitate its withdrawal.

6 Claims, 7 Drawing Sheets

REMOTELY CONTROLLED DEVICE FOR FITTING AND WITHDRAWING A PLUG FOR CLOSING A STEAM GENERATOR TUBE

FIELD OF THE INVENTION

The invention relates to a remotely controlled device for fitting and withdrawing a plug for closing a steam generator tube.

BACKGROUND OF THE INVENTION

The steam generators of pressurized-water nuclear reactors comprise a shell of overall cylindrical shape, inside which a water box is delimited by a thick tube plate to which the bundle of the steam generator tubes is fastened. Each of the tubes in the bundle has two parallel rectilinear legs the end parts of which are fastened inside the tube plate, generally by expansion and by welding.

When the steam generator is in service, the tubes are in contact both with the primary fluid of the nuclear reactor, consisting of pressurized water, and with the secondary fluid consisting of feed water which is vaporized. Under the conditions of use of the steam generator, the tubes are liable to be subjected to various forms of damage and especially to corrosion by the fluids with which they are in contact. Certain tubes of the steam generator may become defective in service and may, for example, exhibit cracks which give rise to leakages resulting in contamination of the secondary fluid.

It is therefore necessary, during the reactor maintenance periods, to intervene in the steam generator and to plug the tubes exhibiting damage capable of giving rise to leakages.

There are various known processes and devices which enable a plug to be placed in the end part of a steam generator tube, from the water box of this steam generator.

It is possible, for example, to use manual plugging tools which require operators to be present inside the water box, which exhibits some degree of radioactivity. The period of intervention in the water box of the steam generator must therefore be strictly limited and monitored.

It is also possible to employ a carrier device of known type which is introduced into the water box of the steam generator and which is capable of installing a tool in the axial extension of the end parts of the tubes to be plugged.

However, there is no known tool permitting the plugging of a tube to be carried out in a completely automatic manner, and remotely controlled.

Furthermore, the known plugging processes and devices of the prior art permit the tube to be closed only in a definite manner without any possibility of subsequent removal of the plug.

In some cases, it may be necessary to carry out the removal of a plug placed in a steam generator tube.

The tubes which are situated in the middle part of the bundle have a curved part connecting their two rectilinear legs with a short radius of curvature. The parts with short radii of curvature, called small bends, render the corresponding tubes particularly sensitive to corrosion because of the presence of a relatively high stress concentration in the curved part.

Programs of blocking the tubes in the middle part of the bundle, in some steam generators have therefore been carried out as a preventive measure.

Since then, effective processes and devices for removing stresses from the small bends have been proposed, and it has become possible to return to use the tubes which had been plugged as a preventive measure.

Furthermore, are also known effective processes for repairing the tubes, which allow the tubes which had been blocked to be brought back into operation, after repair.

It is therefore desirable to have available processes and devices which make it possible to place removable plugs in the tubes of a steam generator and to ensure the withdrawal of these plugs.

There are known plugs for shutting off the tubes of a steam generator which comprise a body of tubular shape, closed by a bottom at one of its ends and a clamping assembly, also tubular, introduced into the bore of the plug body.

The clamping means may comprise, in particular, an insert made of a metal such as nickel and a core made of a nickel alloy with shape memory, both these components being entended to interact in order to ensure the radial expansion of the plug body and its fastening in the tube.

Plugs of this kind can be removed by carrying out the withdrawal of the core, and then the axial withdrawal of the plug body, by applying a pull producing a reduction in area, permitting its removal.

However, there is no known remotely controlled device which makes it possible to carry out both the fitting and the withdrawal of a plug of this kind.

SUMMARY OF THE INVENTION

The purpose of the invention is therefore to provide a remotely controlled device for fitting and withdrawing a plug for closing a tube of a steam generator, which comprises a shell inside which a water box is delimited by a tube plate and a bundle of tubes each having two rectilinear legs whose end parts are fastened inside the tube plate and are accessible from the water box, the closing plug capable of being lodged in an end part of the tube to be closed, comprising a tubular body closed by a bottom at one of its ends and a clamping means of tubular shape capable of being inserted into the plug body and the device comprising, in a known manner, a means of handling arranged in the water box, for its remotely controlled movement and its positioning relative to the end section of the tube, in the alignment of the axial direction of this end section.

To this end, the device according to the invention additionally comprises:
  a means for moving in the axial direction, fastened to the means of handling,
  a support fastened to the means for moving, movable in the axial direction,
  a jack having a chamber integrally fixed to the support and a piston mounted in the chamber for axial movement,
  a connecting member carried by the support having removable means of fastening to the plug body,
  a rod integral with in axial translation to the piston of the jack which is mounted so that it can slide axially in the support and comprising an end section having removable means for fastening to the clamping means of the plug and a bearing surface intended to abut on the bottom of the plug in order to stretch it by a thrust, and a means for delivering plugs from outside the water box into a position close to the tube in its axial alignment.

BRIEF DESCRIPTION OF THE DRAWINGS

In order that the invention may be more clearly understood, a device for fitting and withdrawing according to the invention and its use for the fitting and the removal of a plug in a tube of a pressurized-water steam generator will now be described by way of example with reference to the attached drawings.

DESCRIPTION OF PREFERRED EMBODIMENT

Figure 1:
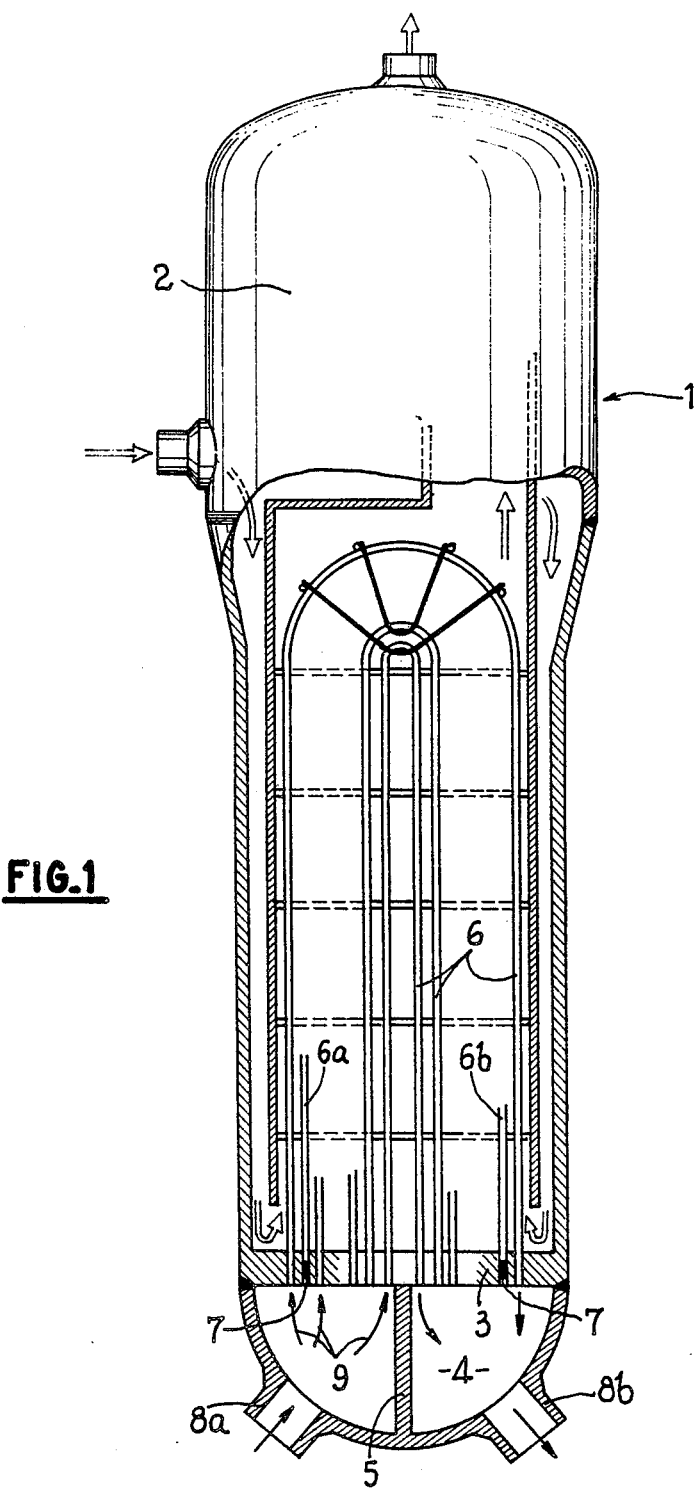
FIG. 1 is an elevation view, partly in section of a steam generator of a pressurized-water nuclear reactor.

FIG. 1 shows a steam generator comprising a shell 2 of overall cylindrical shape in which a tube plate 3 delimits a water box 4 in two sections separated by a partition 5. The tubes 6 of the steam generator which form the bundle comprise two parallel rectilinear legs of great length, connected by a curved section. The ends of the rectilinear legs of the tubes are fastened in the tube plate 3 through which they pass over its entire thickness, to open out into the water box 4.

Two end sections 6a and 6b of a tube which has been closed by plugs 7 are shown. The plugs 7 are installed from the water box 4 by using the device according to the invention.

The pressurized water entering a section of the water box via the pipe 8a and leaving the second section of the water box 4 via a pipe 8b travels in the water generator, inside the tube 6 bundle (arrows 9).

When a tube 6 of the bundle is plugged at its ends, the circulation of pressurized water is completely stopped in this tube.

Figure 2:
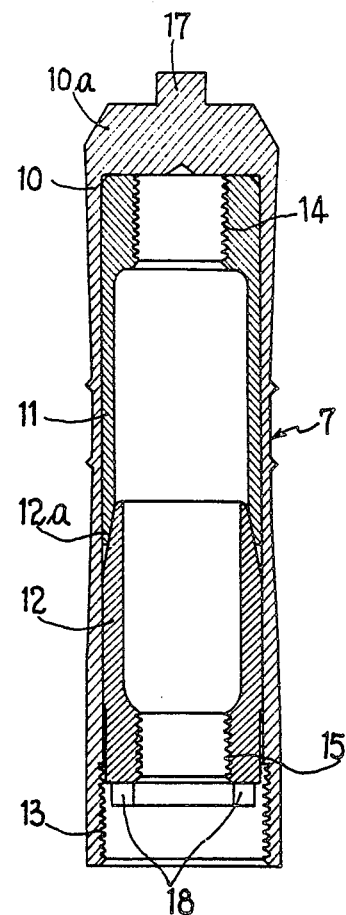
FIG. 2 is a sectional view of a plug for closing a tube of the steam generator.

FIG. 2 shows a plug 7 for closing a tube of the bundle of the steam generator, which plug comprises a tubular body 10 closed by a bottom 10a, at one of its ends, an insert 11 and a core 12, also of tubular shape which may be inserted into the body 10 as shown, in order to produce its radial expansion. The core 12 is made of a nickel alloy with shape memory and comprises a front section of frusto-conical shape 12a intended to interact with a correspondingly shaped clamping surface of the insert 11.

The fitting of the plug may be carried out by introducing the body 10 in an undilated state into the tube 6, the maximum external diameter of the plug being slightly smaller in the undilated state than the internal diameter of a tube 6. The insert 11 is placed in its position which is shown in FIG. 2, and the core 12 is engaged with its frusto-conical surface 12a on the corresponding clamping surface of the insert. The diametric expansion of the body 10 and the fastening of the plug 7 inside the tube 6 are produced by a thrust on the core 12.

When the steam generator is brought into use, the core 12 comes into contact with pressurized water at high temperature (of the order of 320° C.), with the result that the alloy of which the core 12 is made reaches a temperature above its transition temperature. The core 12 then assumes its high temperature shape which produces an additional dilation of the body 10 of the plug 7. This increases the clamping force and the efficiency of the fastening of the closing plug in the tube.

In its lower section, the body 10 comprises a tapped section 13 permitting the body 10 to be assembled with a connecting means, as will be explained later.

Similarly, the insert 11 and the core 12 comprise identical tapped assembly sections 14 and 15, respectively, whose diameter is smaller than the diameter of the tapped section 13.

The bottom 10a of the body 10 of the plug comprises a projecting section 17 permitting the plug to be locked in rotation inside the container of the means for delivering the plugs.

In its lower section, the core 12 comprises two diametrically directed notches 18 permitting the core to be locked in rotation onto a section of the device for fitting and withdrawing the plug.

Figure 3:
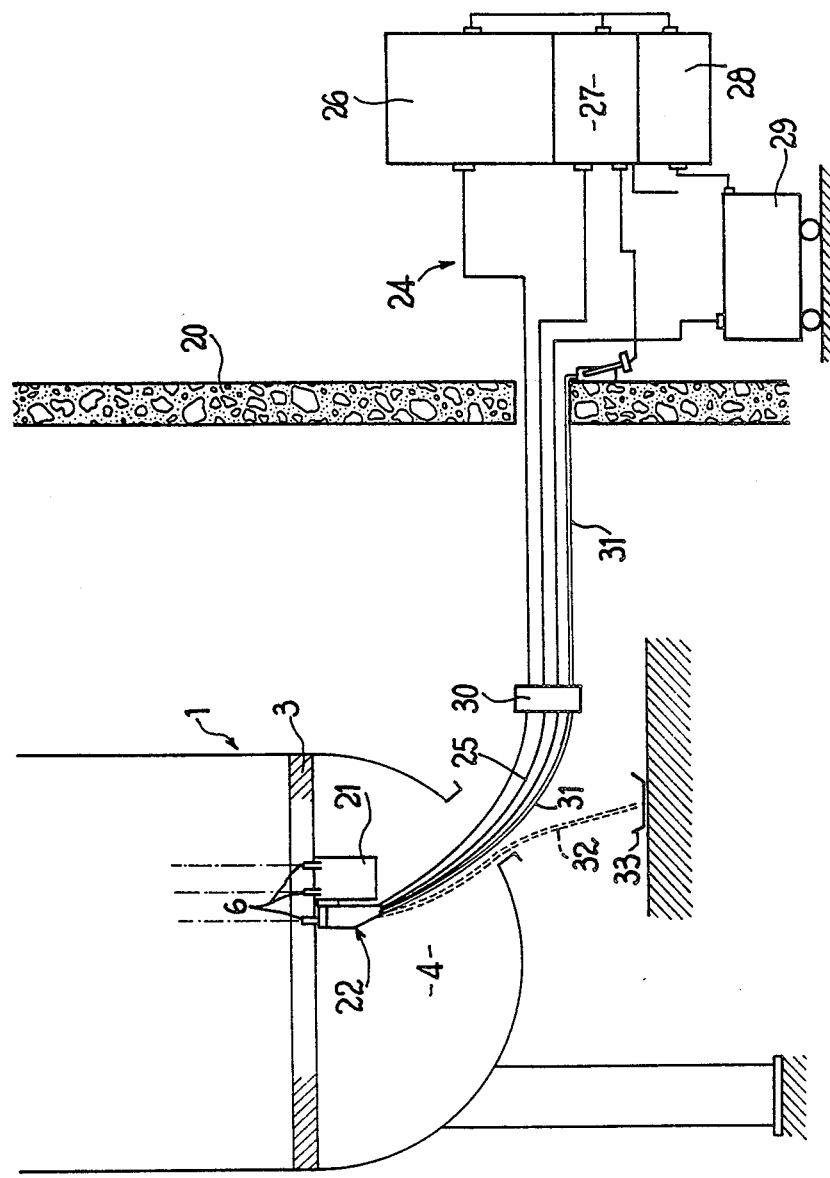
FIG. 3 is a general diagrammatic view of the whole of the equipment permitting the fitting and the withdrawal of closing plugs to be performed.

FIG. 3 shows the whole of the equipment permitting the fitting and the withdrawal of the plugs for closing the tubes 6 of a steam generator 1 to be performed.

The equipment comprises a handling means 21 which may consist of a carrier device of known type introduced into the water box 4 of the steam generator, permitting a tool to be placed successively in the axial alignment of the bundle tubes 6. This handling means 21 may, for example, consist of a rotary arm placed in a working position in the corresponding section of the water box 4.

Fastened to the handling means 21 is an assembly 22 for fitting and withdrawing the plugs, connected by a set of cables and conduits 25 to a control station 24 arranged outside the water box and in a region adjoining the steam generator enclosure 20, in the annular space situated at the periphery of the nuclear reactor.

The control station 24 comprises an electrical and electronic control and monitoring cabinet 26, a pneumatic control unit 27 and a hydraulic control and monitoring unit 28 connected to a hydraulic power supply unit 29.

The supply cables and conduits of the assembly for fitting and withdrawing the plugs 22 are connected to the components of the control station by means of a connector 30.

A conduit 31 for supplying a plug to the assembly 22 is also connected to a device for supplying plugs, situated at the control station 24 and to the pneumatic control unit 27.

A conduit 32 for removing used plugs is connected to the assembly 22 and ends in a receptacle 33 for recovering the used plugs, inside the steam generator room.

Figure 4:
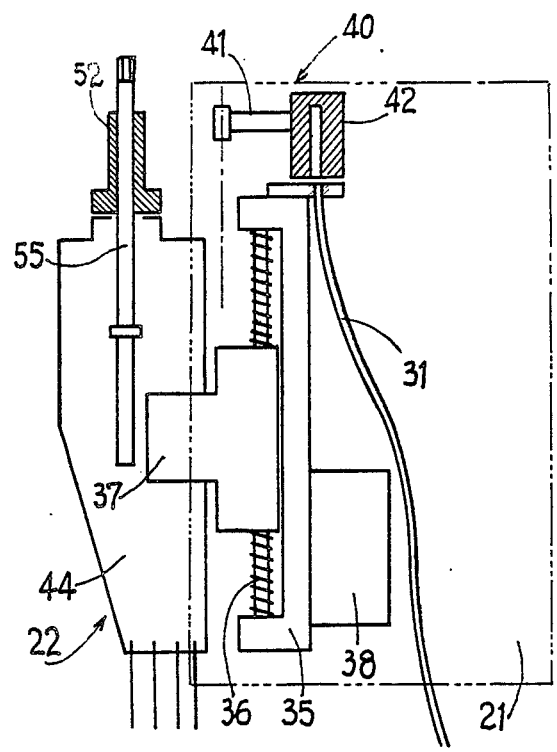
FIG. 4 is a diagrammatic view of the device for fitting and for withdrawal according to the invention.

FIG. 4 shows the whole of the device for fitting and withdrawing fastened to the end of the handling means 21 consisting, for example, of a rotary arm arranged inside the water box compartment. The handling means 21 carries the stationary part of a moving 35 whose movable part 37, fixed integrally to the assembly 22 for fitting and withdrawing travels in the axial direction of the tubes 6 which corresponds to the vertical direction in FIG. 4. The moving means 35 consists of an endless screw 36 mounted so that it can rotate in the stationary part and is driven in rotation by a motor 38. The movable part 37 consists of a bush mounted so that it can slide in the vertical direction on the stationary part, in engagement with the screw 36 and integrally fixed to a support connected to the assembly for fitting and extracting 22.

The handling means 21 also carries the means 40 for delivering the plugs said means comprising an arm 41 mounted so that it can rotate around a vertical axis on the handling means 21 and a receptacle 42 for receiving the plugs, situated in the extension of the end of the flexible conduit 31.

This means 40 will be described in greater detail with reference to FIG. 7.

Figure 5:
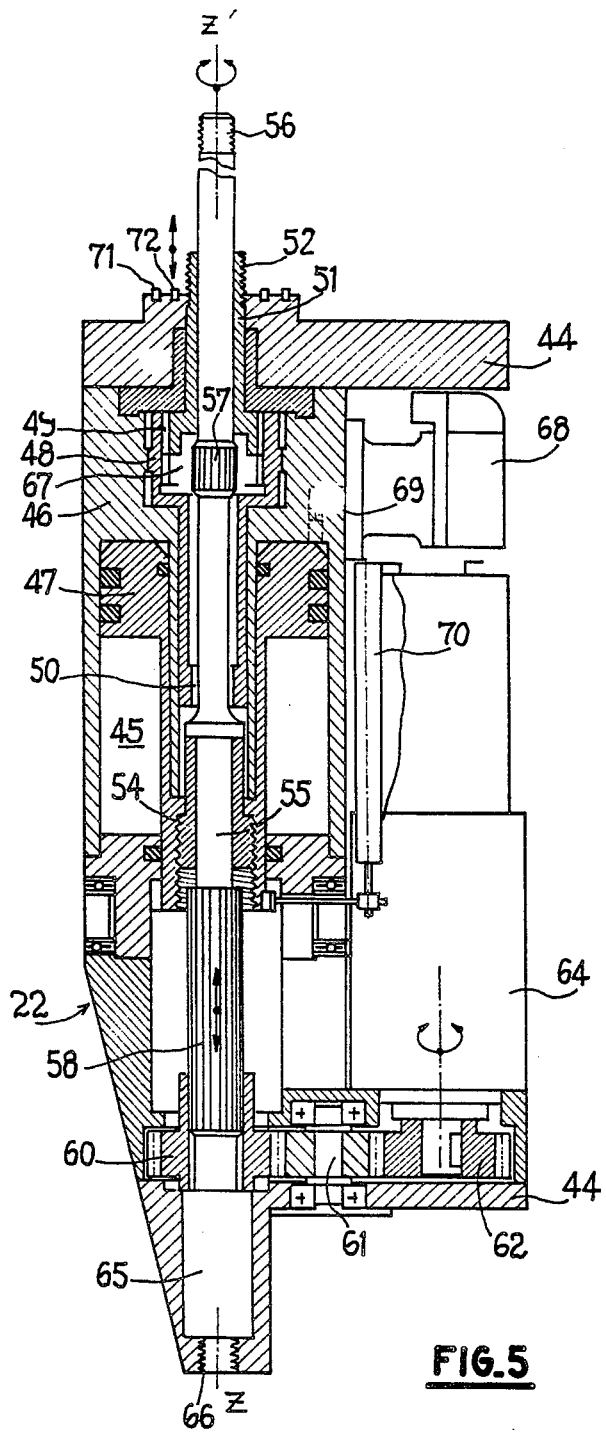
FIG. 5 is a detailed sectional view of a part of the device for fitting and withdrawing according to the invention.

The assembly 22 for fitting and withdrawing has been shown in FIG. 5.

This assembly comprises a support 44 by means of which the assembly 22 is connected to the moving part 37 of the moving means 35. The support 44 carries the assembly for actuating and for driving the device. This assembly comprises a hydraulic jack whose chamber 45 is arranged in a component 46 integrally fastened to the support 44. The jack piston 47 is mounted so that it can move inside the chamber 45, in the axial direction Z—Z', which corresponds to the vertical direction in FIG. 5.

The piston 47 and the chamber 45 are made in an annular shape and the component 46 comprises an internal bore having a large diameter section and a small diameter section. A bush 48 is fastened inside the bore of the component 46 and comprises a small diameter section and a large diameter section which are placed in the corresponding sections of the bore of the component 46. The bush 48 comprises grooves 49 on its inner surface, in its large diameter section, and grooves 50 on a short axial length, in its small diameter section. A tubular connecting member 51 comprising a large diameter section provided with external grooves is engaged by means of this grooved, large-diameter section onto the corresponding grooves 49 of the interior surface of the bush 48 in its large-diameter section. The connecting member 51 comprises a small-diameter part engaged in a guide bore arranged in the support 44 and machined at its end to form a threaded section 52 capable of being engaged onto the tapped section 13 of a plug body 17 shown in FIG. 2.

The piston 47 of the hydraulic jack is integrally fastened in translation, through the intermediary of a ring 54, to a rod 55 mounted so that it can slide in the axial direction inside the support 44 and passing with clearance through the bore of the bush 48 and of the tubular connecting member 51. The rod 55 comprises a threaded section 56 at its end situated outside the support 44, it being possible for this threaded section to be engaged in the tapped section 14 of the insert 11 or in the tapped section 15 of the core 12 of a closing plug 7 as shown in FIG. 2.

The rod 55 also comprises a first grooved section 57 capable of being engaged in the grooves 50 of the bush 48, when the rod is in a low position and a second grooved section 58 at its end away from the tapped section 56. The grooved section 58 is engaged on a corresponding grooved section arranged in the internal section of a pinion 60, driven in rotation, by means of intermediate pinions 61 and 62, by an electrical motor 64 mounted on the support 44.

The support 44 delimits a chamber 65 below the grooved section 58 of the rod 55, this chamber 65 being connected to a compressed air supply line. The rod 55 can therefore be moved upwards pneumatically owing to the action of the compressed air on the lower surface of the grooved section 58. A detector 66 fastened to the lower section of the chamber 65 permits the rod 55 to be detected in a low position.

An annular chamber 67 is arranged around the rod 55, inside the bush 48, this chamber 67 being connected to a compressed air line. Supply of compressed air to the chamber 67 permits the connecting member 51 to be moved upwards pneumatically.

The support 44 carries a servo valve 68 permitting the chamber 45 of the jack to be supplied with hydraulic fluid, via a channel 69 machined in the component 46.

The support 44 also carries a movement sensor 70 and a pressure sensor communicating with jack chamber 45. These sensors permit the operation of the jack to be monitored and, in particular the movements of the piston 47 to be recorded.

The assembly 22 for fitting and withdrawing also comprises two sensors 71 and 72 which are arranged concentrically on the movable support 44, on the face directed towards the tube plate when the device is in use. The sensors 71 and 72 are proximity sensors and are arranged around the connecting component 51 which is intended to engage the plug body.

The sensor 71 makes it possible to monitor the positioning of the assembly 22 relative to the tube plate and the sensor 72 makes it possible to monitor the presence of a plug inside a bore of a passage hole in the tube plate, before this plug is withdrawn.

Figure 6:
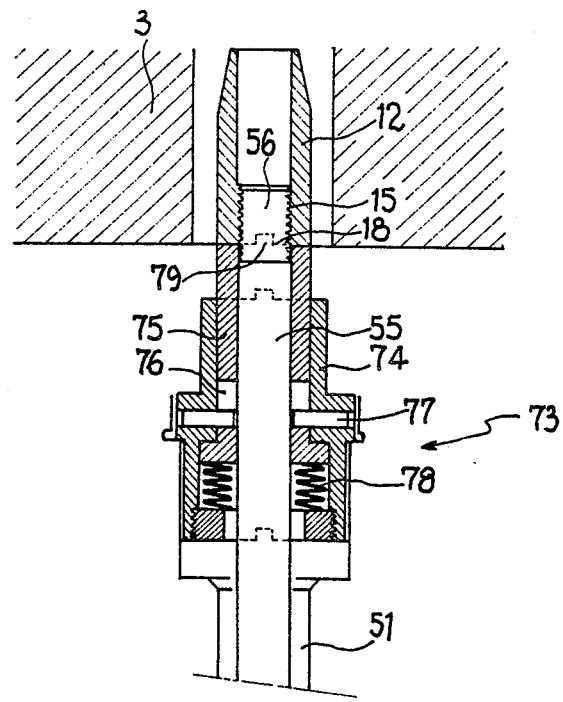
FIG. 6 is a larger scale view of a part of the device coupled onto the core of a closing plug.

FIG. 6 shows an anti-rotation device 73 placed at the end of the connecting means 51 of the assembly 22 for fitting and withdrawing. An anti-rotation device of this kind is employed when a plug is withdrawn, to prevent the rotation of the core 12 when it is being fastened to the end 56 of the sliding rod 55.

The anti-rotation device 73 consists of a tubular body 74 integrally fastened to the connecting device 51 at its end and of a ring 75 mounted so that it can slide in the axial direction inside the body 74. The ring 75 comprises lights 76 in which retaining fingers 77 which are fastened to the body 74 in the radial direction can engage.

Springs 78 ensure the return of the ring 75 outwards. In its upper section, the ring 75 comprises tenons 79 whose shape and dimensions correspond to those of the notches 18 in the core 12 of a plug 7 as shown in FIG. 2.

When a plug is being withdrawn, as will be explained later, the first operation consists of withdrawing the core 12 from this plug. This withdrawal is performed by using the rod 55 whose threaded section 56 is engaged in the tapping 15 of the plug 12.

When the rod 55 is being screwed in, the tenons 79 engage in the notches 18 in the plug 12 if the plug tends to rotate in its housing. Locking in rotation is thus produced and this permits the threaded section 56 of the rod 55 to be screwed in completely.

Figure 7:
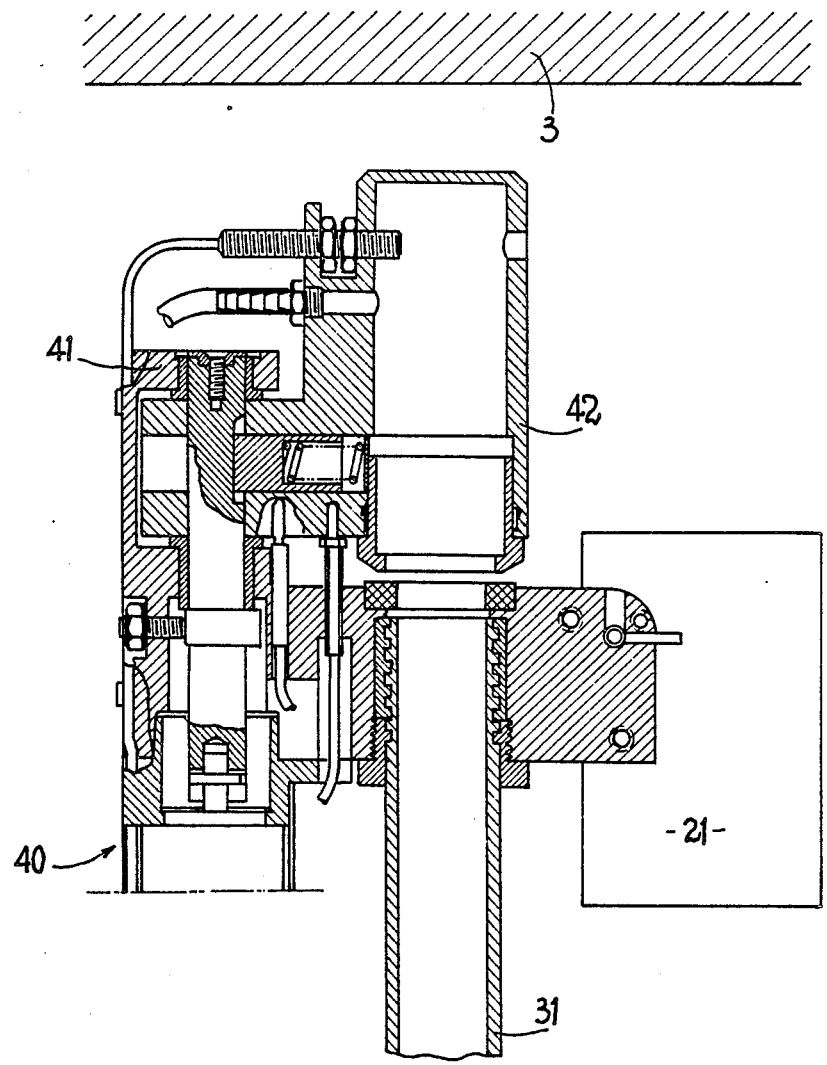
FIG. 7 is a sectional view of the means for delivering the plugs in a working position.

FIG. 7 shows the means 40 for delivering the plugs, which comprises a magazine 42 in the extension of the conduit 31. The end of the conduit 31 is fastened rigidly to the handling means 21 while the magazine 42 is mounted so that it can rotate by means of the arm 41, as has been explained earlier.

The rotation of the arm 41 enables the magazine to be brought either into axial alignment with the end of the flexible conduit 31, or into axial alignment with the tube 6, on which a plug fitting or withdrawing operation is being carried out.

Depending on the stages of utilization of the equipment, either for the fitting or for the extraction of a plug, magazines 42 of a specialized type will be employed, making it possible to receive all or part of the plug in the distorted or in the undistorted state.

The delivery of the plugs to the device 40 is performed pneumatically, inside the conduit 31, under the control of a compressed air supply valve. The plugs arriving via the conduit 31 enter the magazine 42 in an aligned position and are arrested inside the magazine by a braking device.

An operation of fitting and an operation of withdrawing of a plug in a steam generator tube, using the device according to the invention, will now be described successively.

These operations will be described in a remotely controlled automatic operation mode, although the device according to the invention also permits manual interventions in the water box of the steam generator.

The handling means 21 is arranged inside the water box 4 of the steam generator and its end carries the assembly for fitting and withdrawing 22, through the intermediacy of the means of moving 35. The device 21 may consist of a rotary arm mounted in the water box 4 or of a device fastened under the tube plate of the steam generator, which is known to the prior art and referred to by the name of a "spider".

In order to fit a plug, in a first step, a plug 9 is introduced into the magazine 42 placed in the extension of the conduit 31. The plug is conveyed pneumatically in the conduit 31 and is braked automatically and is placed in the magazine 42 on its arrival. This operation is performed by controlling a solenoid valve from the control station 24 of the equipment.

The magazine 42 containing the plug is then rotated by means of the arm 41 so as to bring the magazine 42 and the plug into the axial extension of the tube in which the plug is being fitted.

The assembly 22 is in its lowest position, the movable section 37 of the means for moving 35 being at the lower end of the screw 36. The assembly 22 is furthermore placed in alignment with the axis of the tube, below the magazine 42.

The assembly 22 is lifted by means of the device 35 whose motor 38 is powered so as to cause the screw 36 to rotate.

The sliding rod 55 of the assembly 22 is in its lowest position, the grooved section 57 being engaged in the grooves 50 of the bush 48. The assembly 22 is placed in the magazine 42 in a position such that the threaded end section 52 of the connecting means 51 is situated just below the tapped section 13 of the plug body 7 inside the magazine 42. A pneumatic pressure is established in the chamber 67 and the motor 64 is switched on, causing the rotation of the rod 55 and, through the intermediacy of the grooved region 57, of the bush 48 and of the connecting device 51 engaged in the grooves 49. Simultaneously, air at a pressure of six bars is conveyed into the chamber 67, causing the lifting of the device 51 as it rotates and is being screwed into the tapped section 13 of the plug body 10; during this screwing, the plug is held stationary in rotation, by means of the projecting section 17 engaged in a corresponding notch in the magazine 42.

When the connection between the assembly for fitting 22 and the plug is made, the assembly 22 is lowered into a low position by virtue of the means for moving 35. This downward motion produces the withdrawal of the plug 7 from the magazine 42.

The loading magazine 42 is then moved away from the axis of the tube by rotating the arm 41. The lift of the assembly 22 carrying the plug 7 at its end is then produced by the moving means 35, and this produces the entry of the plug 7 into the tube and its positioning relative to the tube plate 3. This positioning is monitored by the proximity detector 71 which controls the stopping of the means for moving 35 when the desired position is obtained. The plug is then in place inside the passage hole in the tube plate.

The jack chamber 45, in which the piston 47 is in a low position at the initial moment, is then supplied with hydraulic fluid. An approach motion of the rod 55 is produced, which is terminated when the end of the rod is at a distance of the order of 2 mm from the lower end of the plug core 12. A movement of the piston 47 of an amplitude which is perfectly predetermined is then called for, so as to produce a hydraulic thrust on the core 12 and a perfectly predetermined movement of this core 12 inside the plug 7. This movement results in contact with the insert 11 and then in a diametric dilation of the plug body 10 and locking of this plug inside the tube.

The jack is then supplied in the other direction to make the piston 47 descend again until the rod 55 has returned into its low position, this position being detected by the sensor 66. In this low position, the grooved section 57 of the rod 55 is engaged in the grooves 50 of the bush 48. The rotation of the motor 64 in the unscrewing direction permits the section 52 of the connecting means 51 to be unscrewed and separated from the plug.

The descent of the assembly 22 by the moving means 35 is then called for.

The assembly 22 can then be placed, by the handling means 21, in alignment with the following tube, which can be plugged.

An operation of automatic withdrawal of a plug placed inside a steam generator tube 6 will now be described.

This withdrawal operation is carried out in two steps between which the equipment of the assembly 22 for fitting and for withdrawing is slightly modified.

The first step of a withdrawal operation consists in removing the core 12 from the plug 7.

In order to perform this operation, the connecting means 51 of the assembly 22 is equipped with the anti-rotation device 73 shown in FIG. 6. The loading-unloading device 40 is equipped with a core removal magazine which can be placed in coincidence with a flexible removal conduit 32.

At the initial moment, the assembly 22 is in a low position and in axial alignment with the tube in which the plug to be withdrawn is situated. The jack piston 47 and the sliding rod 55 are in a low position as shown in FIG. 5.

The lift of the assembly 22 is produced by the means for moving 35, until the time when the stoppage of the means 35 is called for by the plug detector 72. The end of the rod 55 is then at a distance of the order of 2 mm from the lower part of the core.

The end part 56 of the rod 55 is then screwed into the tapped part 15 of the core 12, by making the motor 64 rotate in the screwing direction and by conveying compressed air into the chamber 65. Unlocking of the core 12 inserted into the plug is then produced by applying a force of a specified amplitude to the rod 55 through the intermediary of the jack piston 47.

The complete withdrawal of the core 12 is then produced by lowering the assembly 22 by the moving means.

The magazine 42 of the loader-unloader is then placed in the axis Z—Z' of the rod 55 of the assembly 22, itself in coincidence with the axis of the tube. The magazine 42 of the loader-unloader is then inserted between the tube plate and the end of the rod 55 of the assembly 22.

The entry of the core 12 into the magazine 42 of the loader-unloader is then produced by lifting the assembly 22 by the moving means 35.

When the core is in position in the magazine 42, the unscrewing of the section 56 of the rod 55 is produced by means of the motor 64.

The magazine 42 is placed to coincide with the end of the removal conduit 32 and the machine is replaced in a low position.

The core 12 is expelled from the magazine 42 and removed pneumatically into the conduit 32 and then into the collecting receptacle 33.

The rod 55 is placed back in its initial position and the assembly 22 may be placed vertically in line with the next tube, in order to carry out a new withdrawal of a core 12.

The operation of withdrawal of a plug 7 comprises a second stage in which the withdrawal of the plug body 10 and of the insert 14 inserted into the body 10 is carried out.

To perform this stage, use is made of the assembly 22 comprising the connecting means 51 whose end consists of a threaded section 52 and a rod 55 having a threaded end section 56 whose length is slightly greater than the tapped section 14 of the insert 11. The loader-unloader device 40 is equipped with a removal magazine 42 capable of receiving a plug distorted by pulling.

At the initial moment, the assembly 22 is in a low position and placed so that the axis Z—Z' of the rod 55 is aligned with the axis of the plug 7 to be withdrawn.

The jack piston 47 is then in a position such as to enable the rod 55 to come out over a length sufficient for its end to be situated at a distance of approximately 2 mm from the tapped section 14 of the insert 11 when the assembly 22 has reached a high position, determined by the plug detector 72.

The lifting of the machine is produced by the moving means 35, the end of the travel being determined by the plug detector 72.

A withdrawal of the assembly 22 is then produced by a descent over a length of 3 mm.

The connecting means 51 is then screwed into the plug body 10, the end of the screwing being determined by the plug detector 72.

The rod 55 is then screwed into the tapped section 14 of the insert 11.

Lubricating grease is then injected into the plug body 10 to facilitate the withdrawal of the insert 11 and to prevent it from jamming in the body 10. This injection can be carried out through a channel machined inside the sliding rod 55 and opening into the region of this rod which is situated inside the body 10.

This injection can also be carried out by an independent injection device, before any action of the assembly 22 on the plug in order to withdraw it. A withdrawal of the insert 11 over a short and predetermined length is produced by a pull on the rod 55.

The threaded section 56 of the rod 55 is then screwed additionally into the tapped section 14 of the insert 11, until the flat end part of the rod 55 forming a thrust surface comes into contact with the interior surface of the bottom 10a of the body 10 of the plug 7.

A thrust is then applied to the bottom 10a of the plug, through the intermediary of the rod 55, by the piston 47 of the jack 45. This produces the stretching of the body 10 of the plug, which undergoes a contraction ensuring its separation from the tube 6. During this stretching, the lower end of the body 10 consisting of the tapped section 13 is held by the connecting device 51 bearing on the support 44 of the assembly 22.

The assembly 22 is then moved by the means 35 as far as its low position, and this produces the withdrawal of the body 10 and of the insert 11 from the plug 7. During this withdrawal, the rod 55 continues by means of the jack 45 to exert a thrust on the bottom of the plug held on the assembly 22 by the connecting device 51.

When the withdrawal has taken place, the piston 47 of the jack 45 is moved so as to release the stresses on the rod 55, this movement being of the order of 4 mm.

The magazine 42 of the loader-unloader device 40 is then placed on the axis Z—Z' of the assembly 22, and then the plug body 10 and its insert 11 are introduced into the magazine 42 by lifting the assembly 22 by the moving means 35.

When the plug body 10 is in place in the magazine 42, the rod 55 whose threaded section 56 is engaged in the tapped section 14 of the insert 11 is unscrewed.

The rod 55 is then withdrawn by actuating the piston 47, and the connecting means 51 is then unscrewed and is thus separated from the plug body 10.

The magazine 42 of the loader-unloader device is placed in a removal position in the extension of the flexible conduit 32.

The body 10 with its insert 11 is expelled pneumatically into the conduit 32 and then into the collecting receptacle 33.

It can be seen that the device according to the invention makes it possible to carry out the operation of fitting and withdrawing a plug in a steam generator tube, in a wholly automatic and remotely controlled manner and without damaging the tube, the plug body being stretched during the withdrawal, which results in contraction and release of the plug body.

The use of connecting means between the assembly for fitting and withdrawing and the various parts of the plug is possible, these means being other than threaded sections situated at the end of the rod or of the sleeve.

A relative arrangement which differs from the connecting means 51 and of the sliding rod 55 providing the connection with the various sections of the plug is also possible.

It is also quite obvious that the assembly for fitting and withdrawing could be combined with automatic means for supplying and removing plugs and with remotely controlled handling means which are other than those described.

The device according to the invention can also be used manually.

To enable it to be used, the device for fitting and withdrawing must be equipped with various adapters, depending on the operations which are carried out and depending on the nature of the successive stages of these operations It is therefore preferable for the various stages of the fitting and withdrawing operations to be carried out in series on all the plugs which are being fitted and withdrawn, in order to avoid having to take the device out of the water box in order to adapt the pieces of equipment which are required, between two operations which are carried out on different plugs.

The invention does not apply solely to the fitting and the withdrawal of a plug in the water box of a steam generator of a pressurized-water reactor, but may be employed whenever it is desired to plug or to remove a plug in a tube to which it is difficult to have access.

I claim:

1. Remotely controlled device for fitting and withdrawing a plug (7) for closing a tube (6) of a steam generator, said stem generator comprising a shell (1) inside which a water box (4) is delimited by a tube plate (3) and a bundle of tubes (6) each having two rectilinear legs (6a, 6b) having end parts fastened inside the tube plate (3) and accessible from the water box (4), the closing plug (7) capable of being housed in an end part of the tube (6) to be closed, said plug comprising a tubular body (10) closed by a bottom (10a) at one of its ends and a clamping means (11, 12) of tubular shape capable of being inserted into the body (10) of the plug (7), the device comprising a handling means (21) arranged in the water box (4) for its remotely controlled and its positioning relative to the end section (6a, 6b) of the tube (6) in the alignment of the axial direction of this end section (6a, 6b), wherein said device additionally comprises:

(a) a means for moving (35) in the axial direction (ZZ'), fastened to the handling means (21);
    (b) a support (44) fastened to the means for moving (35), movable in the axial direction (Z—Z');
    (c) a jack having a chamber (45) integrally fixed to the support (44) and a piston (47) mounted in the chamber (45) for movement in the axial direction (Z—Z');
    (d) a connecting member (51) carried by the support (44) having a threaded section (52) for connecting to the plug body (10);
    (e) a rod (55) integral in axial translation with the piston (47) of the jack (45), said jack being mounted for axial sliding movement in the support (44) and comprising an end section having a threaded section (56) for connecting to the clamping means (11, 12) of the plug (10) and a bearing surface intended to abut on the bottom (10a) of the plug (10) in order to stretch it by a thrust;
    (f) a means (40) for delivering plugs (7) from outside the water box (4) to a position close to the tube (6) in its axial alignment; and
    (g) a connecting member (51) consisting of a tubular sleeve having external grooves slidably engaged with the grooves (49) of a bush (48) rotatably mounted in the support (44) and comprising a second set of grooves (50), the rod (55) being mounted along the axis (Z—Z') of the sleeve (52) and of the bush (48) and comprising a first grooved section (58) engaging with a pinion for driving in rotation (60) and a second grooved section (57) capable of engaging the grooves (50) of the bush (48) in a position of the sliding rod (55) so as to drive the connecting member (51) in rotation through the intermediary of the bush (49).

2. Device for fitting according to claim 1, wherein a chamber (65) is arranged in the support (44) in the extension of the end of the rod (55) remote from its connecting end (56), this chamber (65) communicating with a compressed air supply line permitting a thrust to be exerted on the rod (55) in the axial direction (Z—Z').

3. Device according to claim 1, wherein the movable support at least one proximity detector (71, 72) on its face which is intended to come opposite the tube plate (3).

4. Device according to claim 1, wherein a chamber (67) communicating with a compressed air supply line is arranged around the rod (55) inside the bush (48), at one of the ends of the connecting member (52), so as to exert a thrust in the axial direction (Z—Z') on the connecting member (51), by conveying compressed air into the chamber (67).

5. Device according to claim 1, which it additionally comprises a means for injecting lubricant into the plug body (10).

6. Device according to claim 5, wherein the means for injecting lubricant comprises an injection channel machined inside the rod (55).

* * * * *